United States Patent
Hamid et al.

(10) Patent No.: US 6,498,861 B1
(45) Date of Patent: Dec. 24, 2002

(54) BIOMETRIC SECURITY ENCRYPTION SYSTEM

(75) Inventors: Laurence Hamid, Ottawa (CA); Gordon S. Freedman, Ottawa (CA)

(73) Assignee: Activcard Ireland Limited, Dublin (IE)

(*) Notice: Subject to any disclaimer, the term of this patent is extended or adjusted under 35 U.S.C. 154(b) by 169 days.

(21) Appl. No.: 09/618,285

(22) Filed: Jul. 18, 2000

Related U.S. Application Data

(63) Continuation-in-part of application No. 09/328,269, filed on Jun. 17, 1999, which is a continuation-in-part of application No. 09/045,810, filed on Mar. 23, 1998, now Pat. No. 6,259,805, which is a continuation of application No. 08/899,704, filed on Jul. 24, 1997, now Pat. No. 6,072,892, and a continuation of application No. 08/804,267, filed on Feb. 21, 1997, now Pat. No. 6,038,334, and a continuation-in-part of application No. 08/760,228, filed on Dec. 4, 1996, now abandoned.

(51) Int. Cl.[7] ............................................... G06K 9/00
(52) U.S. Cl. ...................................... 382/124; 340/5.52
(58) Field of Search .................... 382/115–127; 235/380, 382, 382.5; 902/3–6; 713/182, 186; 340/5.21, 5.52, 5.53, 5.8, 5.81, 5.82, 5.83

(56) References Cited

U.S. PATENT DOCUMENTS

| | | | | |
|---|---|---|---|---|
| 4,993,068 A | * | 2/1991 | Piosenka et al. | 235/380 |
| 5,202,929 A | * | 4/1993 | Lemelson | 340/5.74 |
| 5,229,764 A | | 7/1993 | Matchett et al. | |
| 5,493,621 A | | 2/1996 | Matsumura | |
| 5,613,012 A | | 3/1997 | Hoffman et al. | |
| 5,613,014 A | | 3/1997 | Eshera et al. | |
| 5,615,277 A | * | 3/1997 | Hoffman | 382/115 |
| 5,999,637 A | | 12/1999 | Toyoda et al. | |
| 6,148,094 A | * | 11/2000 | Kinsella | 345/167 |

* cited by examiner

Primary Examiner—Joseph Mancuso
Assistant Examiner—Vikkram Bali
(74) Attorney, Agent, or Firm—Freedman & Associates

(57) ABSTRACT

A method of registering biometric data is disclosed wherein a registration profile is formed of those templates that have a likelihood of registering with the biometric data that is within predetermined limits. The profile is then compared against one or more other profiles to determine an individual most likely to have said profile. That individual is then identified. Optionally, the profile comparison is used in conjunction with a individual registration values formed by comparison between the biometric data and stored templates.

12 Claims, 14 Drawing Sheets a0000404.i b0000404.i c0000404.i

Table of Comparison Scores for 3 Instances
of Same Fingerprint a0000404.i vs b0000404.i:54.01
a0000404.i vs c0000404.i:64.22
b0000404.i vs a0000404.i:40.09
b0000404.i vs c0000404.i:86.20
c0000404.i vs a0000404.i:32.87
c0000404.i vs b0000404.i:79.20

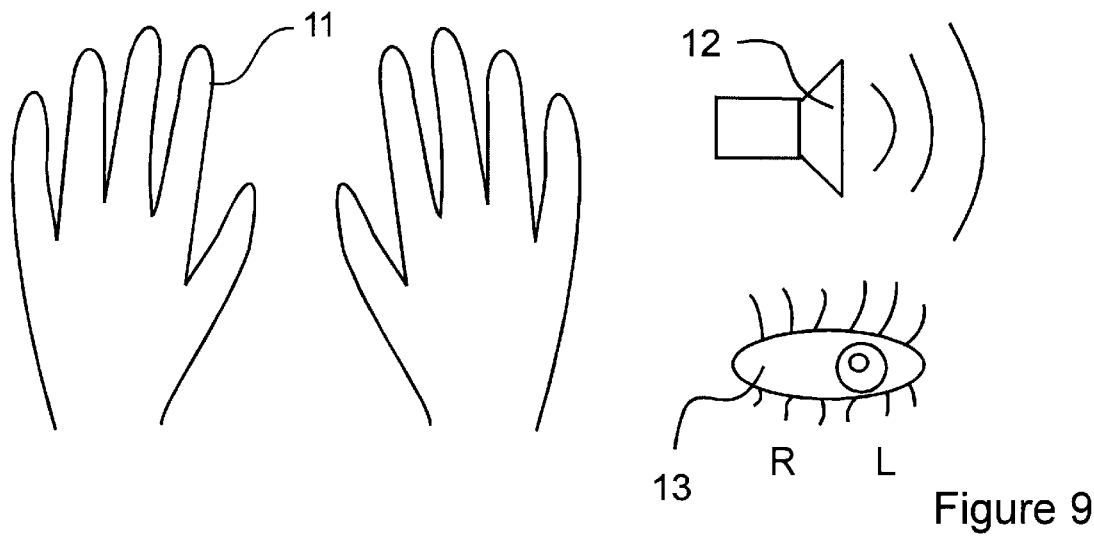
Figure 9
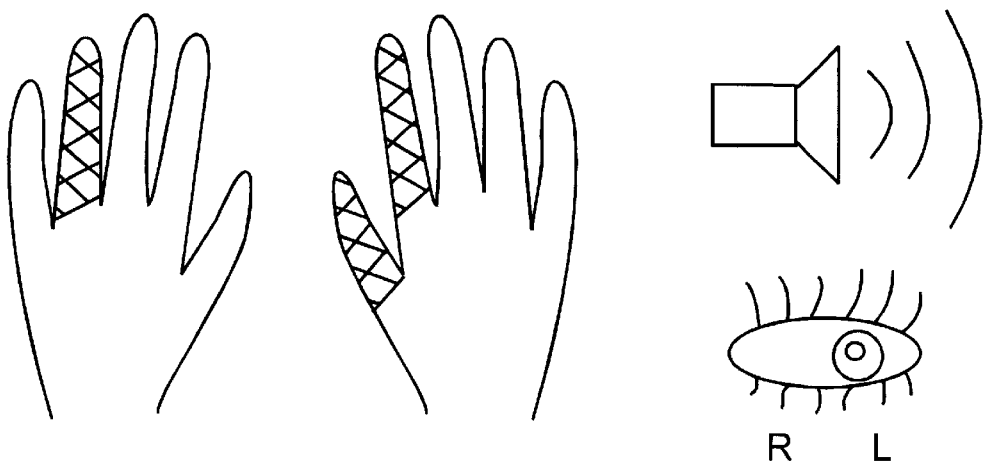
Figure 9a
Please provide Fingerprint from left ring finger.
Please provide Fingerprint from right thumb.
Please provide Fingerprint from right index finger.
Figure 9b

US 6,498,861 B1

BIOMETRIC SECURITY ENCRYPTION SYSTEM

This is a continuation-in-part from U.S. patent application Ser. No. 09/328,269, filed on Jun. 17, 1999, which is a continuation-in-part from Ser. No. 09/045,810 filed on Mar. 23, 1995 now U.S. Pat. No. 6,259,805 issued Jul. 10, 2001 which is a further continuation-in-part from U.S. Pat. Ser. No. 08/760,228 filed Dec. 4, 1996, now abandoned and a continuation Ser. No. 08/804,267 filed on Feb. 21, 1997 from U.S. Pat. No. 6,038,334 issued Mar. 14, 2000, and Ser. No. 08/899,704 filed on Jul. 24, 1997 U.S. Pat. No. 6,072,892 issued Jun. 6, 2000.

FIELD OF THE INVENTION

This invention relates generally to identification of individuals and more particularly relates to a method of identifying individuals based on biometrics and potential false matches.

BACKGROUND OF THE INVENTION

Computer security is fast becoming an important issue. With the proliferation of computers and computer networks into all aspects of business and daily life—financial, medical, education, government, and communications—the concern over secure file access is growing. A common method of providing security is using passwords. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten, as users have no reliable method of remembering them. Writing down the codes and storing them in close proximity to the access control device (i.e. the combination lock) results in a secure access control system with a very insecure code. Alternatively, the nuisance of trying several code variations renders the access control system more of a problem than a solution.

Password systems are known to suffer from other disadvantages. Usually, a user specifies a password. Most users, being unsophisticated users of security systems, choose passwords that are relatively insecure. As such, many password systems are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. A second important issue to be addressed is the identification process itself and more particularly, the registration process.

A common method of registering users for a biometric identification system is to capture biometric input information, characterise it, and store it as a template. Unfortunately, such a method is limited to data relating to a single user and is prone to false acceptance when two or more users have similar extractable biometric features. This results in significant reduction in security or, conversely, when security is maintained, in significant inconvenience to the users.

OBJECT OF THE INVENTION

It is an object of this invention to provide a means of identifying an individual that is based on data from a user to be identified and data from other users.

It is an object of the invention to provide a method of forming a biometric template providing a second verification method for biometric data without requiring provision of a second biometric information sample to be useful.

SUMMARY OF THE INVENTION

In accordance with the invention there is provided a method of identifying an individual presenting a biometric information source to a system. The method comprises the steps of:

receiving a biometric information sample from a biometric information source of the individual;

characterising the biometric information sample;

comparing the characterised biometric information sample against some of a plurality of stored templates to determine a registration profile comprising indicators of a plurality of templates that match the characterised biometric information sample within predetermined limits;

comparing the registration profile against at least a stored registration profile to determine an identification associated with a registration profile similar to the determined registration profile; and, identifying the individual when the associated registration profile is similar with the determined registration profile within a first predetermined limit.

In accordance with the invention there is provided a method of storing information for use in identifying an individual presenting biometric information comprising the steps of:

receiving biometric information from the individual;

comparing the biometric information to stored templates to determine registration results associated with each of the stored templates, the templates stored within a database of templates; and, based on the registration results, storing a registration profile including indicators of a plurality of templates stored within the database.

In accordance with the invention there is provided a method of identifying an individual comprising the steps of:

receiving a biometric information sample from a biometric information source of the individual;

characterising the biometric information sample;

comparing the characterised biometric information sample against some of a plurality of stored templates to determine a registration profile comprising a predetermined number of indicators of a plurality of templates that most closely match the characterised biometric information sample;

comparing the registration profile against at least a stored registration profile to determine an identification associated with a registration profile similar to the determined registration profile; and, identifying the individual when the associated registration profile is similar with the determined registration profile within a first predetermined limit.

The advantages of a system in accordance with this invention are numerous. For example, registration of authorized users requires less information from a user since information inherent to the database of templates is used to more accurately register biometric information and biometric data provided from an individual.

BRIEF DESCRIPTION OF THE DRAWINGS

An exemplary embodiment of the invention will now be described in conjunction with the attached drawings, in which:

FIG. 9 is a simplified diagram of a user interface for entering parameters according to the invention;

FIG. 9a is a simplified diagram of FIG. 9 with some parameters selected for entry;

FIG. 9b is a simplified diagram of a display having prompts thereon requesting provision of biometric information from predetermined biometric information sources;

DETAILED DESCRIPTION

The invention will be described with respect to finger print registration. The method of this invention is useful in other biometric based identification processes as well.

Fingerprint characterisation is well known and can involve many aspects of fingerprint analysis. The analysis of fingerprints is discussed in the following references, which are hereby incorporated by reference:

Xiao Qinghan and Bian Zhaoqi: An approach to Fingerprint Identification By Using the Attributes of Feature Lines of Fingerprint," IEEE Pattern Recognition, pp 663, 1986

C. B. Shelman, "Fingerprint Classification—Theory and Application," Proc. 76 Carnahan Conference on Electronic Crime Countermeasures, 1976.

Feri Pernus, Stanko Kovacic, and Ludvik Gyergyek, "Minutaie Based Fingerprint Registration," IEEE Pattern Recognition, pp 1380, 1980.

J. A. Ratkovic, F. W. Blackwell, and H. H. Bailey, "Concepts for a Next Generation Automated Fingerprint System," Proc. 78 Carnahan Conference on Electronic Crime Countermeasures, 1978.

K. Millard, "An approach to the Automatic Retrieval of Latent Fingerprints," Proc. 75 Carnahan Conference on Electronic Crime Countermeasures, 1975.

Moayer and K. S. Fu, "A Syntactic Approach to Fingerprint Pattern Recognition," Memo Np. 73-18, Purdue University, School of Electrical Engineering, 1973.

Wegstein, *An Automated Fingerprint Identification System*, NBS special publication, U.S. Department of Commerce/National Bureau of Standards, ISSN 0083-1883; no. 500-89, 1982.

Moenssens, Andre A., *Fingerprint Techniques*, Chilton Book Co., 1971. Wegstein and J. F. Rafferty, *The LX*39

*Latent Fingerprint Matcher*, NBS special publication, U.S. Department of Commerce/National Bureau of Standards; no. 500-36, 1978.

Figure 1:
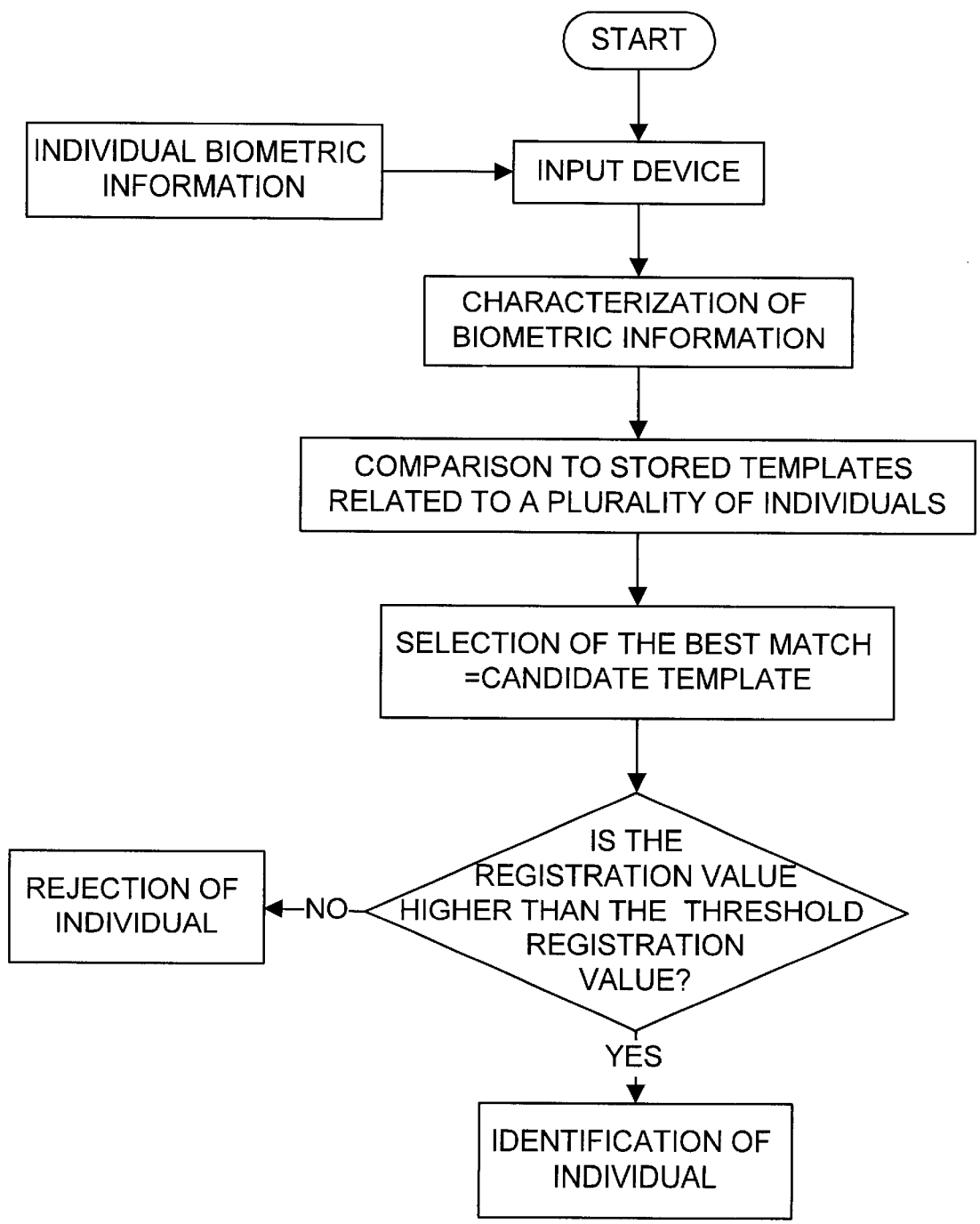
FIG. 1 is a flow diagram of a prior art method of registering a biometric data sample.

Referring to FIG. 1, a prior art method of registering a biometric data sample in a one to many fashion is shown. An individual presents biometric information to an input device. The information is compared to templates derived from biometric information of a plurality of individuals. The best match from the comparisons is typically selected as a candidate template. The registration value is then compared to a threshold registration value and when it is better than the threshold, the individual is identified.

Figure 2:
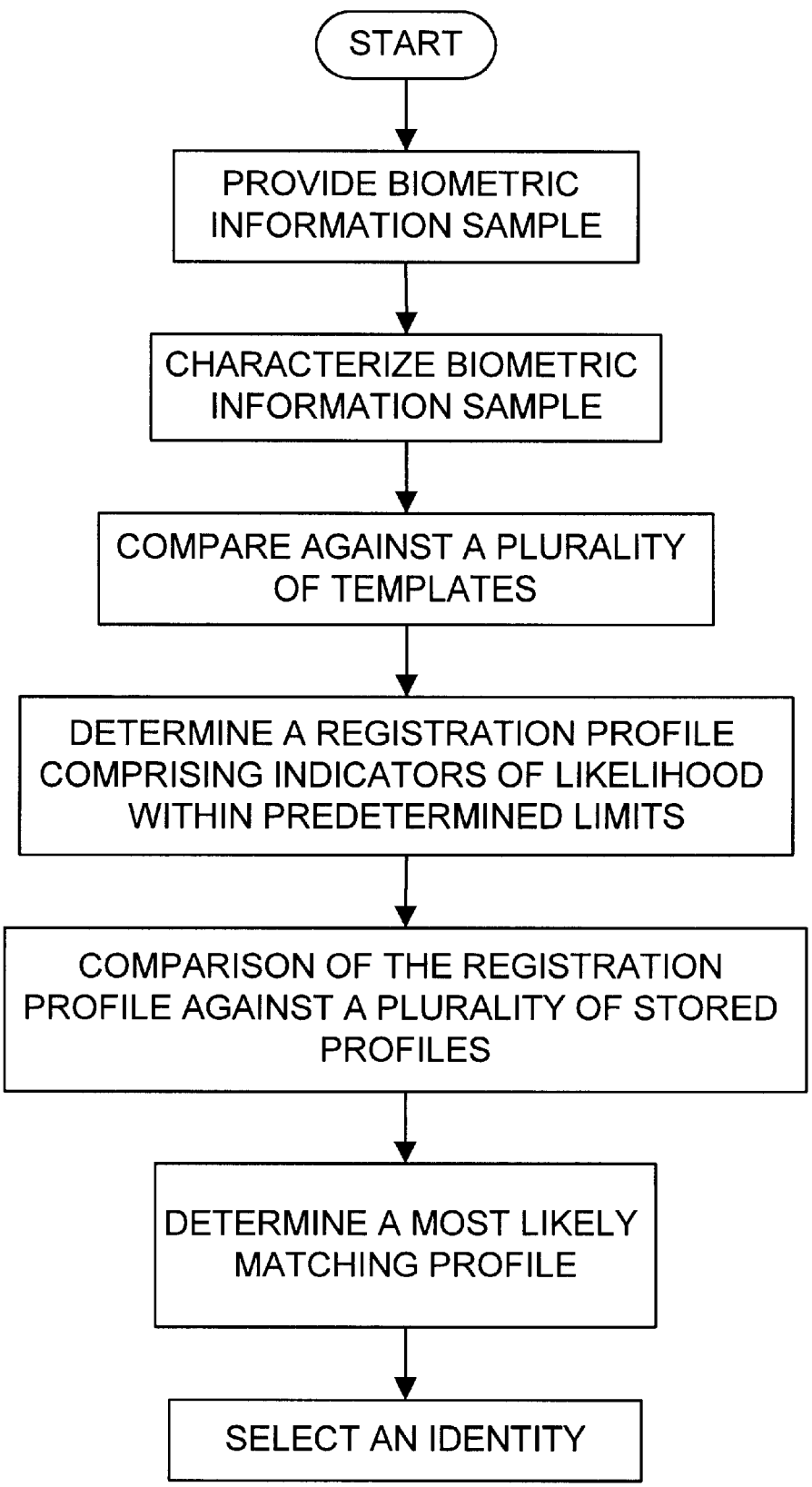
FIG. 2 is a simplified flow diagram of a method of identifying an individual in accordance with the invention.

Referring to FIG. 2, a simplified flow diagram of a method according to the invention is shown. An individual provides a biometric information sample to a biometric input device. The sample is characterised and compared against a plurality of biometric information templates. A profile is formed comprising a listing of those templates that match with a likelihood within a predetermined range of likelihoods. The profile is then compared against a plurality of stored profiles to determine a most closely matching profile. An identity relating to the most closely matching profile is selected for use in identifying the individual.

Figure 3:
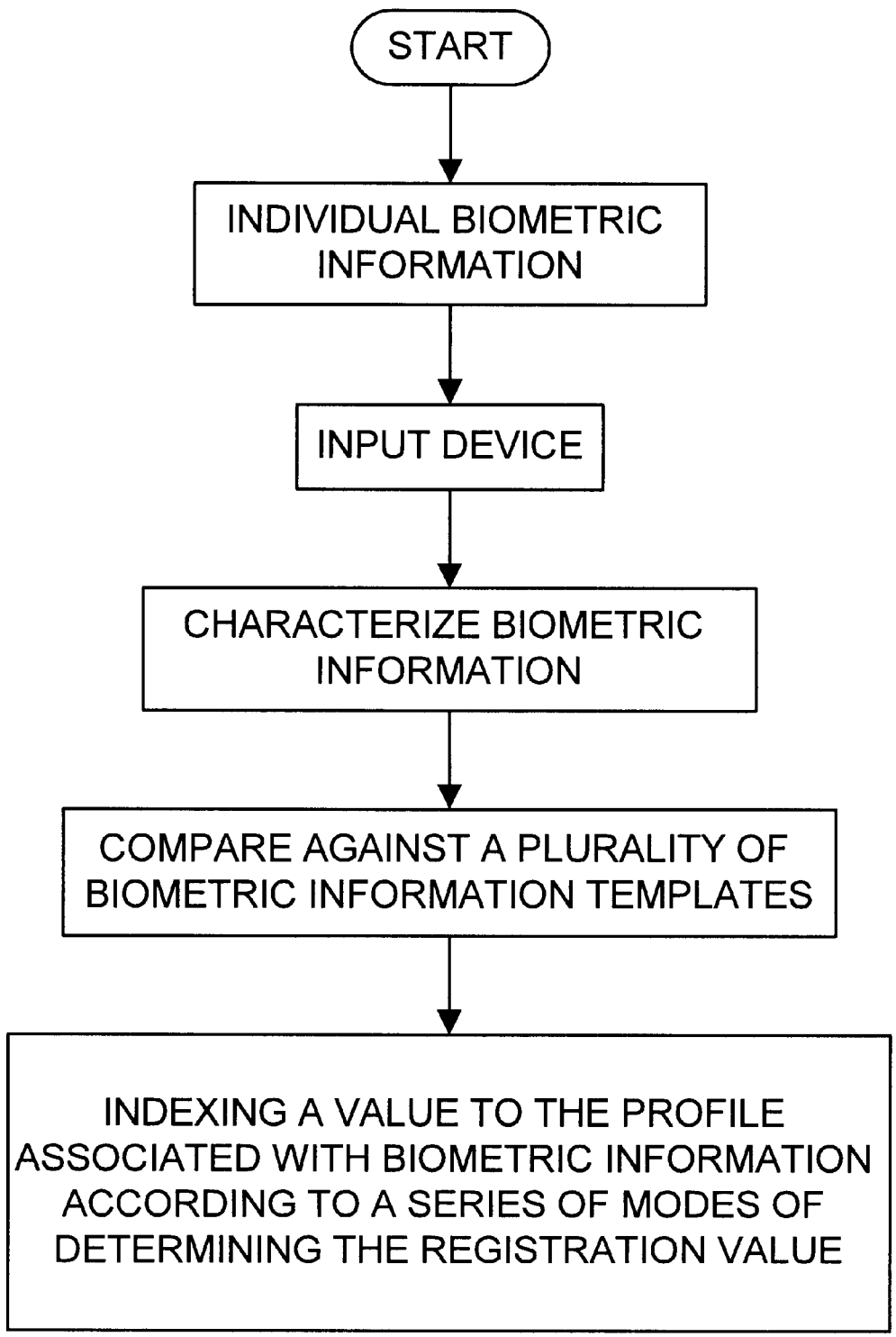
FIG. 3 is a flow diagram of a further method of selecting a biometric template requiring n biometric data sets.

The present invention relies on the repeatability of computer-generated errors. It is likely that a same person will be falsely identified somewhat repeatedly. In other words, once an individual is identified as X one time, a higher likelihood of being identified as X in the future exists. Thus, by forming a profile of individuals with whom each biometric information might be identified, information about the likely identity of the individual is formed. As shown in FIG. 3, by using this further information in conjunction with known biometric identification techniques enhanced reliability results.

Referring to FIG. 3, an individual provides a biometric information sample to a biometric input device. The sample is characterised and compared against a plurality of biometric information templates. Table 1 lists the registered people and a likelihood that each is the individual providing the biometric information sample.

TABLE 1

| Name | Registration Result | Ranking |
| --- | --- | --- |
| Abigail | 212 | 2 |
| Bob | 43 | 6 |
| Charles | 12 | 9 |
| Denise | 218 | 1 |
| Edmund | 120 | 3 |
| Frasier | 120 | 3 |
| George | 12 | 9 |
| Henry | 65 | 5 |
| Isabelle | 34 | 7 |
| Jacob | 28 | 8 |

Given an identification threshold of 150, there are two possible identifications, Abigail and Denise. Prior art techniques would identify the individual either based on a first match or based on a best match. Here a best match is Denise. That said, Abigail is quite likely. Another option is to fail to identify the individual unless further information is provided from the individual. It would be advantageous to identify the individual accurately without requiring further information from the individual. Therefore, according to the invention the profile presented in Table 1 or a portion thereof is compared to profiles associated with identities. For example, given the profiles set out in Table 2, it is evident that Abigail is a better match than Denise and is the more likely candidate. Therefore, Abigail is identified absent presentation of further biometric information from the individual.

TABLE 2

| Abigail's profile | | Denise's profile | |
| --- | --- | --- | --- |
| Denise | Very close | Edmund | Very close |
| Edmund | Less close | George | Less Close |
| Frasier | Less close | Henry | Less Close |
| | | Isabelle | Less Close |

Figure 4:
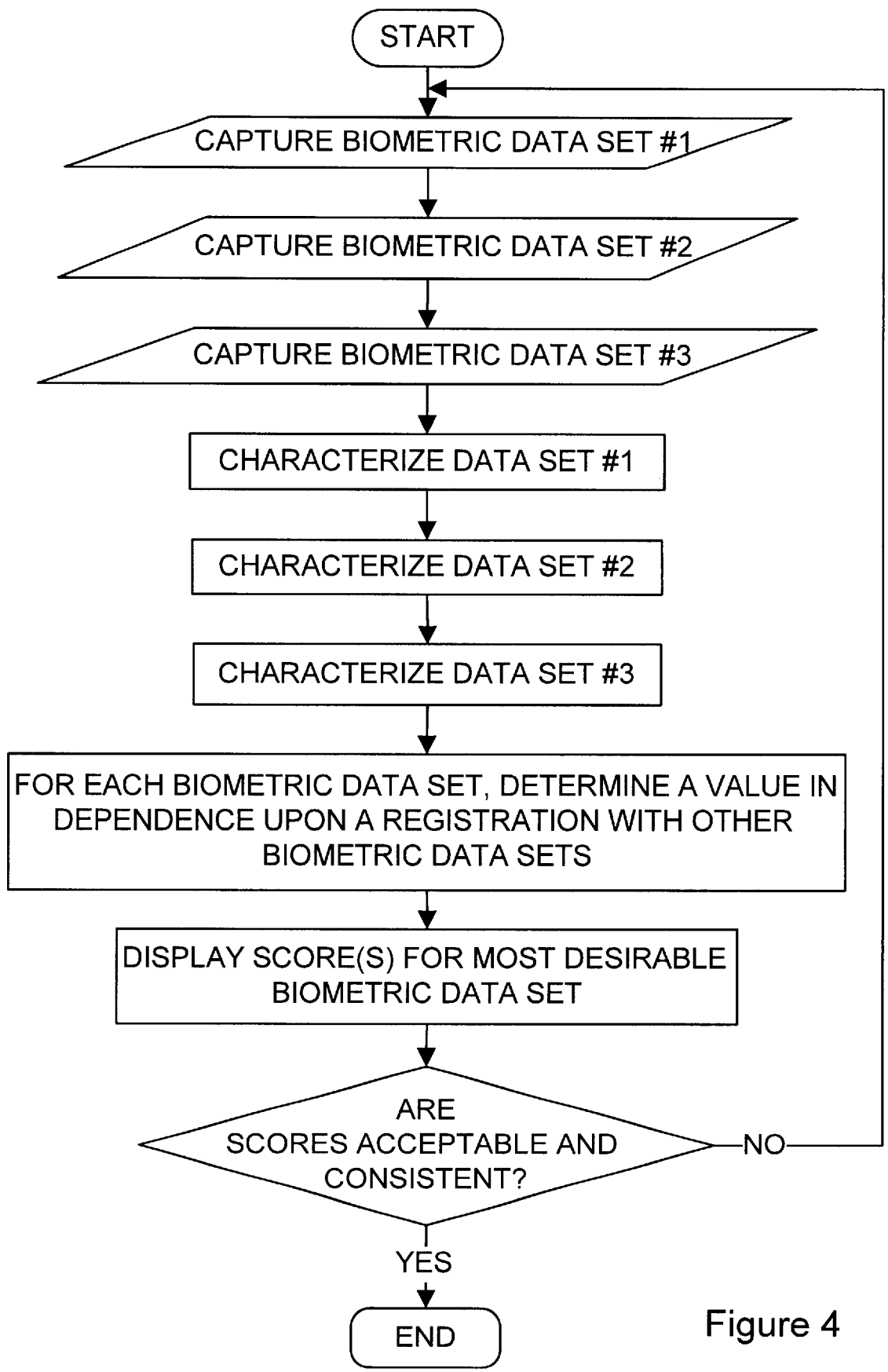
FIG. 4 is a flow diagram of a method of training users of a biometric input system according to the invention.

Most biometric identification systems work most effectively when users provide similar biometric input information each time they access a system. This is because similar features are then extracted with more reliability. That said, using the method of the present invention, more information relating to the user's identity is derived from a same biometric information sample. Alternatively, as shown in FIG. 4, the profile may be formed cumulatively over a large number of biometric information samples. For example, each time an individual is identified, the profile determined is updated such that it converges as the individual learns to use the biometric scanner on a steady state profile. Though false rejections often result from inexperienced users of a biometric input device and more specifically from poor presentation of biometric information, the present invention will lessen these and is capable of adapting as users use the system over a period of time.

Figure 5:
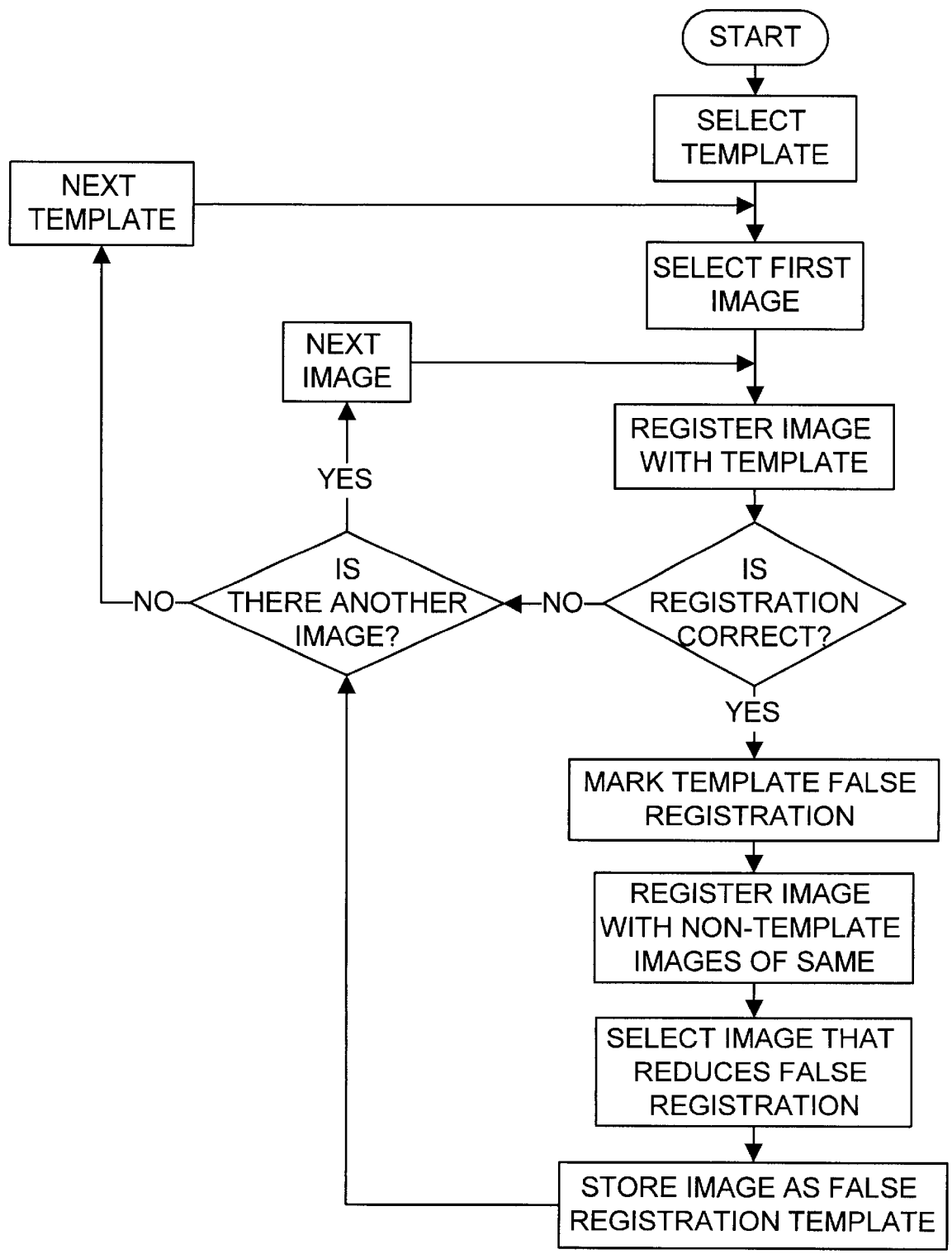
FIG. 5 is a flow diagram of a method reducing false acceptance (incorrect registration) of users of a biometric identification system according to the invention.

Referring to FIG. 5, a method of using the present invention for reducing false registration is presented. Templates are selected according to a known method of selecting same. A plurality of images is captured for each individual having a template. The images are each characterised and their characterisations are stored. Each image is registered against every template to identify potential false acceptance. For large systems, such a task is very time consuming and would be best executed as a background task. When a possible false registration is identified, the potential false registration result is added to a profile of false registrations for use in future identification of individuals. The profile is stored with the original template. The profile, for example, is in the form of a plurality of identifiers of the biometric information sources that falsely register. Optionally, information relating to the template identified as having a potential for false registration is also stored such as a score or a relative score. The task executes until all images have been registered against all templates. Thus, when an acceptance or identification occurs, the system has information relating to a profile of false acceptance for the identified user. Comparison of the provided biometric information with those templates corresponding to individuals within the profile establishes a profile for the provided biometric information. When it is similar to the profile associated with the identified individual, the individual is correctly identified. The resulting reliability of the system is thereby improved. When a very large number of users are enrolled, such an improvement is statistically significant. Also, when an individual has no likely false acceptance potential indicated in their profile, any potential false acceptance will indicate that further biometric information is required to securely identify the individual.

Figure 6:
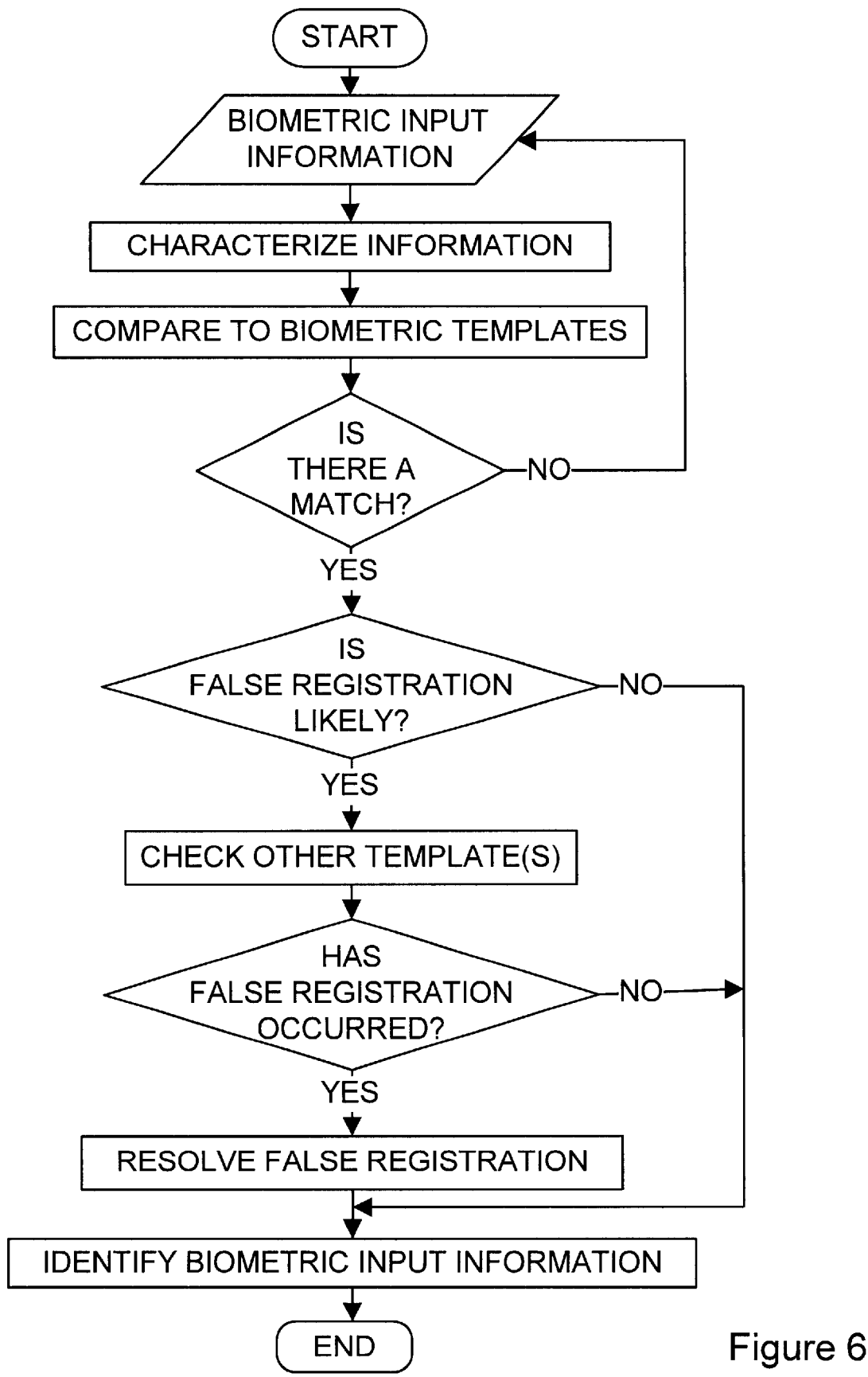
FIG. 6 is a flow diagram of a method of identifying the source of biometric input information in a system employing the method shown in the flow diagram of FIG. 5.

Referring to FIG. 6, a flow diagram of a method of identifying a user in dependence upon biometric input information is shown for a system employing a method of reducing false registration as described with reference to FIG. 5. A user provides biometric information in the form of a fingerprint image. The image is characterised. The characterised image is compared against templates to locate user information. When a registration occurs (a template is sufficiently similar to the biometric information provided) the system verifies the provided biometric information against templates indicated in the registration profile. When the registration profile matches, false registration is unlikely and registration is complete. When it is likely, the biometric information provided is compared to templates corresponding to each individual within the profile's associated profiles. A best profile and registration combination is selected when sufficiently certain of being a correct user identification.

Figure 7A:
FIG. 7a is a representation of a fingerprint image captured by an optical fingerprint imaging means.
Figure 7B:
FIG. 7b is a representation of another instance of a fingerprint image captured by an optical fingerprint imaging means.
Figures 7C, 7D:
FIG. 7c is a representation of another instance of a fingerprint image captured by an optical fingerprint imaging means.
FIG. 7d is a chart showing results from registrations using each of the fingerprint images of FIGS. 7a, 7b and 7c as templates and the others as biometric input information.

FIGS. 7a, 7b and 7c represent fingerprint images captured by an optical fingerprint-imaging device. A fingerprint is substantially unique and is identifiable by a series of criteria. These criteria include core size, core type, location of minutia, ridge spacing, ridge type, etc. Each feature can be located and stored for later registration of unknown prints. Unfortunately, accurately mapping out all features and determining registration based on partial prints and skewed prints is very time consuming; and. it is beneficial to minimize the time required to register a print. Therefore, not all features are analyzed to register each print. Correlation results are shown in FIG. 7d for the fingerprints of FIG. 7a, FIG. 7b and FIG. 7c. The results indicate that registering a fingerprint on a second fingerprint is not commutative. As such, the number of registrations required to select a template cannot be reduced by registering each pair only one time. Of course, when a commutative registration algorithm is used, each pair only requires a single comparison.

Alternatively, the method is employed with retinal scanned biometric information. Further alternatively, the method is employed with palm prints. Further alternatively, the method is employed with non-image biometric data such as voice prints.

Distinguishing Between Multiple User Identities

One of the problems with a finger print biometric is that a segment of the population can have temporary or permanent skin conditions which cause poor image quality on the scanning device which in turn causes them to experience high false rejection rates. By allowing candidates to use more than one finger during authentication, lower thresholds for authentication are combined in a way which confirms identities yet does not compromise the level of false acceptances for the system.

Thresholds from a set of distinct fingerprints from a candidate that would usually be rejected for being too insecure are combined according to this method to allow acceptance in dependence upon a plurality of biometric information samples. Thus a candidate lowers the chance of being falsely rejected by supplying multiple biometric information samples in the form of fingerprints for authentication.

Figure 8:
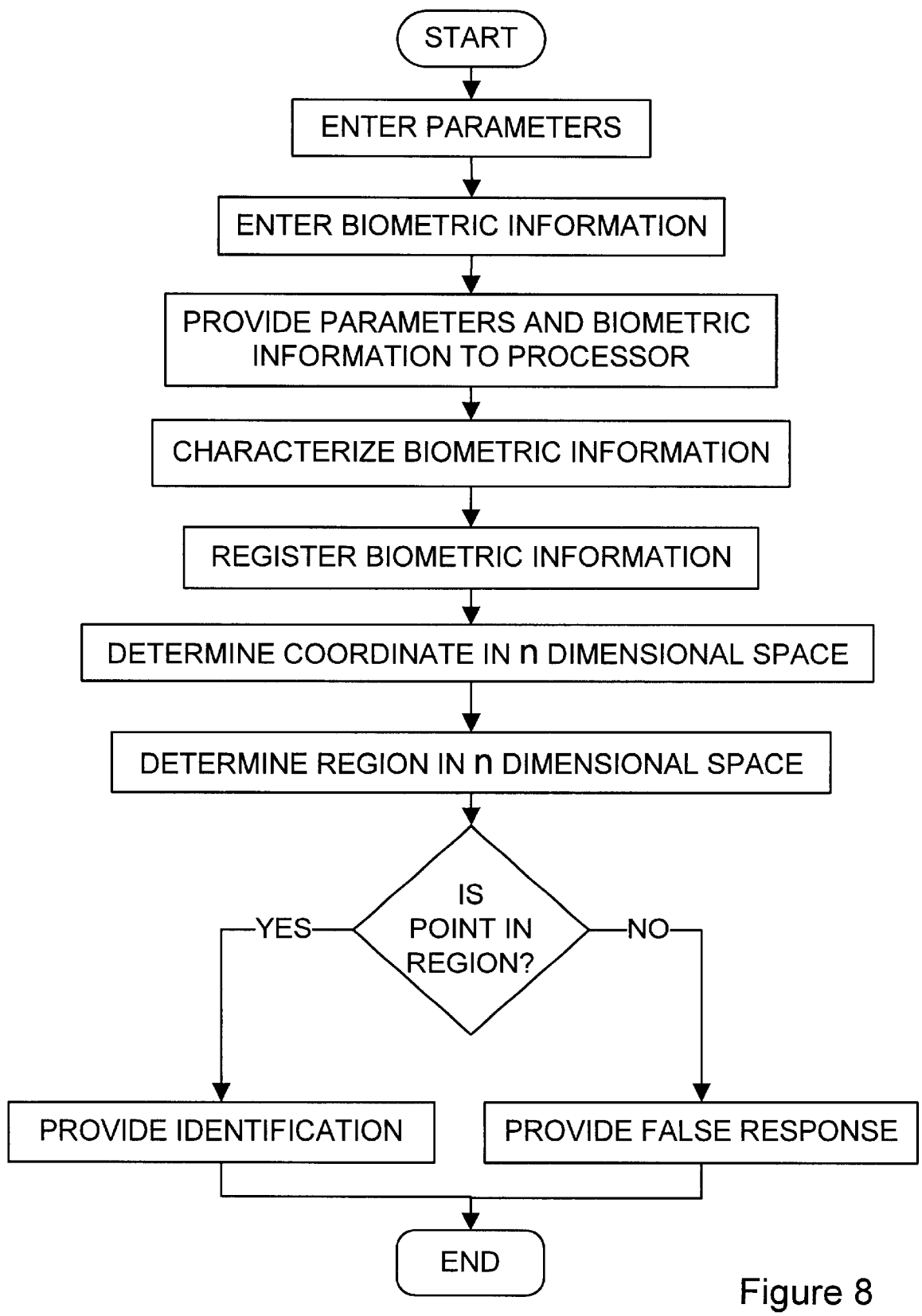
FIG. 8 is a flow diagram of a method of providing biometric information and identifying a user in dependence thereon according to the invention.

In FIG. 8, a flow diagram of a method of improving identification by using multiple biometric information samples is shown. Biometric information in the form of fingerprints is provided to a processor. According to the invention, a plurality of samples from at least two biometric information sources is provided. These samples are in the form of fingerprints, palm prints, voice samples, retinal scans, or other biometric information samples.

Requiring an individual to enter biometric information samples from at least two biometric information sources allows for improved registration results and reduced false acceptance. For example, some individuals are known to be commonly falsely accepted or identified as taught above. The false acceptance taught above is a result of similarities between biometric information samples from a biometric information source of a registered individual and from a biometric information source of another registered individual. These similarities are often only present for a specific similar biometric information source such as a left index finger or a right thumb. The provision and registration of two biometric information samples, reduces likelihood of similarity because, where before similarity of a single biometric information source resulted in false acceptance, now similarity in two different sources is unlikely. Therefore, requiring a minimum of two biometric information sources reduces a likelihood of false acceptance. The use of a plurality of varied biometric information sources in the form of retinal scans, voice prints, finger prints, palm prints, toe prints, etc. further reduces probability of false registration; it is unlikely that the varied biometric information from two individuals is similar.

Similarly, requiring an individual to enter biometric information samples from at least two biometric information sources reduces the probability of false rejection. As the likelihood of false acceptance decreases, a lower threshold for acceptance becomes acceptable. Both false rejection and false acceptance are thereby reduced or, in other words, probability of accurate identification is improved. It is common, in building access systems to maintain a database of individuals within the building and to deny those individuals access to the building a second time. In accordance with one embodiment of the present invention, decreasing false rejection is achieved by allowing a system to distinguish between users currently within and those currently outside a building even when biometric information from one or more biometric information sources is similar.

Each biometric information sample is associated with a biometric information source in the form of a fingertip, a retina, a voice, a palm, etc. The association allows for comparison between the biometric information sample and a template associated with the biometric information source. When an individual's identity is provided to the processor or is known, the biometric information sample is only compared to a single template associated with the biometric information source. Alternatively. the biometric information sample is compared against a plurality of templates. Comparing biometric information samples is often referred to as registering the biometric information samples. Many methods are known for performing the registration. Commonly, the biometric information sample is characterised according to a method specific to the template. The template and the characterised biometric information sample are compared to determine a registration value. The registration value is then used to determine identification; to provide access to a system or structure; to log access; to monitor use; for billing; or for other purposes.

When an individual's alleged identity is not provided to the processor or known to the processor, the characterised biometric information is registered against templates stored in a database of templates in order to locate those registrations which are indicative of a predetermined characteristic. The characteristic is often identity but other characteristics are also known. Because a plurality of biometric information samples is provided, the registration against templates is for locating a plurality of templates that are indicative of a predetermined characteristic. When the characteristic is identity, the templates are from a same individual and the registration process tries to locate a set of templates that registers with the characterised biometric information samples resulting in a set of values indicative of accurate identification.

Referring specifically to FIG. 8, a flow diagram of an embodiment of the invention for identifying an individual is shown. An individual seeking authentication by a user authorization system is presented with a parameter entry means. Parameter entry means are well known in the art of computer science. Some examples of parameter entry means include dedicated switches; software for execution on a processor and for providing an individual with means for selecting or customizing parameters in the form of prompts, a command line, or a graphical user interface; cards or other storage means for provision to a device capable of reading stored parameters and providing them to a processor; wireless data entry; and voice data entry systems.

Using the parameter entry means, the individual determines biometric information sample parameters. The parameters are selected from a known group of available parameters. Examples of known groups of biometric information samples include (right index finger, left index finger, left thumb); (right index finger, voice); (retinal scan, voice); (left thumb, left middle finger), etc. Groupings reduce user entry requirements; however, groupings also reduce flexibility. Alternatively, parameters are entered when an individual selects from all available parameters in order to determine a group. For example, an individual is presented with a graphical display, as shown in FIG. 9, of biometric information sources in the form of fingers 11 and selects a number of samples for each source. When a voice recognition system is incorporated into the user authorization system, an icon 12 representing voice is also displayed. When a retinal scanning system is incorporated, an icon 13 representing the retinal scan is displayed. Other icons are displayed when corresponding biometric identification systems are present. The individual enters parameters in the form of identifying biometric information sources and for each source a quantity of samples being provided.

Preferably a minimum set of requirements exist which, though flexible, ensures sufficient levels of security. Requiring each individual to enter information from a minimum number of biometric information sources and perhaps a maximum number of samples from a same biometric information source allows for maintenance of at least a predetermined security level.

Once the parameters have been entered, the individual enters biometric information into the system in accordance with the parameters. Preferably, the parameters once selected are sent to a processor for analysis and the individual is prompted to enter each biometric information sample. Alternatively, the parameters and the biometric information are sent to a processor together.

The biometric information provided by the individual is related to the parameters selected. For example, referring to FIG. 9a, when the individual selects left ring finger once, right thumb once, and right index finger once, the individual then provides a sample of a fingerprint from the left ring finger, a fingerprint sample from the right thumb and a fingerprint sample from the right index finger. Prompting, shown in FIG. 9b, allows the individual to select very complicated sets of biometric information sources or to select from predetermined sets without remembering the parameters and/or an order for the parameters.

A biometric input means in the form of a live fingerprint scanning device is used to collect the biometric information in the form of images of fingerprints of the individual which are entered in a predetermined order. Each biometric information sample is identified. When the individual is prompted for a biometric information sample, the processor labels the samples. Alternatively, an individual enters parameters and biometric information simultaneously by entering a biometric information sample and identifying the sample as, for example, a specific fingerprint or a voice sample. Optionally, the individual is provided with a means of reviewing and accepting or discarding biometric information samples.

The authentication procedure determines an independent sequence of comparison scores from the input provided by the candidate. This sequence is considered to be a point, hereinafter referred to as P, in n-dimensional vector space, $R^n$. A threshold function $h_\alpha: R^n \to R$ is used to determine whether or not the point belongs to a set $U_\alpha$ by $P \epsilon U_\alpha \Leftrightarrow h_\alpha(P) \geq C_\alpha$. The identity of the individual is confirmed if and only if $P \epsilon U_\alpha$.

Since the sequence is independent, it is also applicable piecewise through evaluation of a single biometric information sample and then, should the first sample provide insufficient likelihood of an accurate identification, provision and evaluation of subsequent biometric information samples follows. Further, the information resulting from the first evaluation is useful in assessing which biometric information samples will best distinguish between known individuals.

The biometric information sample identifiers are used to uniquely identify the input samples. Let I be the set of input images, $I=\{I_i | 1 \leq i \leq N\}$. For $I_i \epsilon I$, let $Id_i$ be the identifier of an image, let $T_i$ be the characterisation or template of the image, and let $T_i^*$ be the reference template of the image.

Define the equivalence relation ≡, on the set I by $$I_i \equiv I_j \Leftrightarrow Id_i = Id_j;$$

The sets $$H_k = \{I_i | I_i \equiv I_k\}$$

are equivalence classes that partition the set of input images into sets of images that belong to a same finger tip. There are n of these classes where $1 \leq n \leq N$.

When τ is a set of all fingerprint templates generated by a given characterisation algorithm and score: $\tau \times \tau \to R$ is the measure generated by an associated matching algorithm, then we can construct a set of class representative, $I_R$, which contains one representative for each $H_k$:

$$I_R = \{I_j \epsilon H_k | \text{score}(T_j, T_j) = \max\{\text{score}(T_i, T_i^*)\}, 1 \leq k \leq N\} I_i \epsilon H_k$$

The set $I_R \subseteq I$, is then a set of images of the distinct input fingerprints that achieve the highest scores.

For each $I_i \epsilon I_R$, $1 \leq i \leq n$, let $x_i = \text{score}(T_i, T_i^*)$ correspond to scores from the matching algorithm. Any ordering of these scores is a point in the vector space $R^R$, simply by constructing the n-tuple $(x_1, X_2, \ldots, X_n) = P$.

Essentially, as shown in FIG. 8, once a set of parameters is selected, a graphical distribution of identifications is achievable in n-dimensions. The biometric information samples are provided to a processor. Registration is conducted against known templates in dependence upon the selected parameters. Once registration is complete, a single point is determined having coordinates equal to each of at least some of the registration results. Alternatively, the point has coordinates determined in dependence upon the registration results but not equal thereto. Plotting the point results in a point plotted in n-dimensional space. The processor then determines a probability distribution for the selected parameters. Alternatively, this is performed prior to the registration process for biometric information samples. Further alternatively, the probability distributions are determined or approximated in advance and stored in non-volatile memory.

Given an n-dimensional plot defined by a boundary function and a single point, a comparison determines whether or not the point falls below or above the function and optionally within or outside other known ranges. Stated differently, the point is analyzed to determine whether it falls within a suitable region wherein region is defined as an n-dimensional region having at least some known boundaries. When the point falls within a predetermined or suitable region, the individual is identified. When the point falls outside the predetermined or suitable region, the individual is not identified. The identification system then responds accordingly. Responses in the form of locking an individual out, denying an individual access, logging an attempted entry by an unidentified individual, etc. are well known and are beyond the scope of the present invention.

Figure 10:
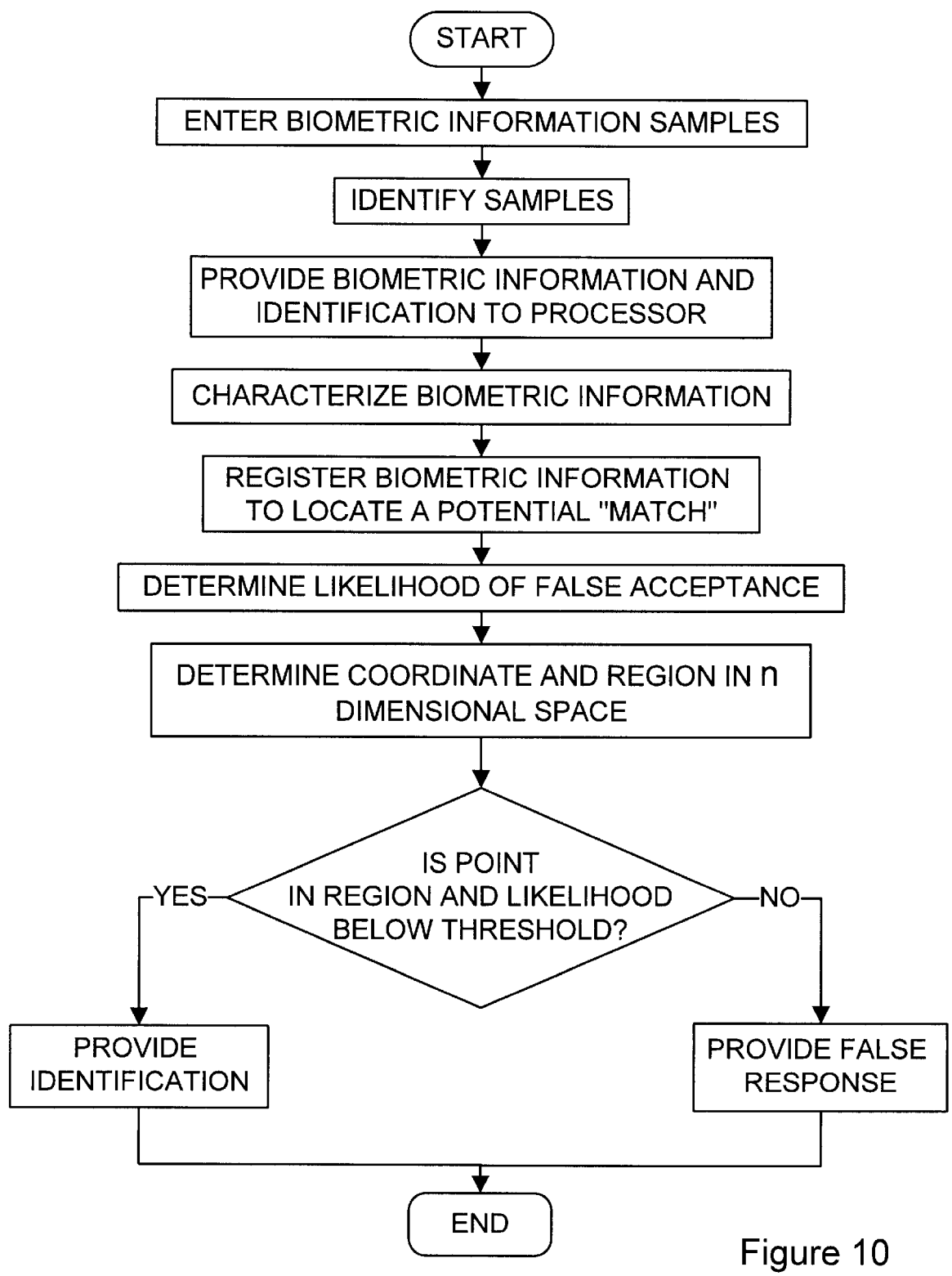
FIG. 10 is a flow diagram of another method of providing biometric information and identifying a user in dependence thereon according to the invention.

Referring to FIG. 10, a simplified flow diagram of another embodiment for user identification is shown. Biometric information samples are provided to a processor and associated with their biometric information sources in the form of fingertips, eyes, palm, or voice. The biometric information samples and the associated information are provided to a processor. The processor characterises the biometric information samples and registers them against templates. When the individual's alleged identification is known, registration is performed against templates associated with the individual and associated with same biometric information sources. Identification of an individual is conducted in a fashion similar to that set out for FIG. 8 above. Once a user is identified. data relating to the user and to a likelihood of false acceptance is read. The identification is used with the data to determine whether further biometric information samples are required. For example, when the data comprises identities of other users whose biometric information is similar to that of the identified user, a comparison of templates of each of the other users and the characterised biometric information indicates whether any of the other users is also a potential match. In an alternative embodiment, with each user identity is included a similarity indication to allow a determination of whether the identification with its known likelihood poses a significant possibility of false identification for said user identity. Thus, only user identities having a likelihood of being falsely accepted are verified. Of course, depending on the amount of data relating to each possible error in identification, different responses occur. Essentially, it is significant that information relating to errors in identification that have or could occur is stored with an identification and is then used to improve the identification results.

In an embodiment, when a system in the form of a door access system has limited input and output capabilities, each biometric information sample is verified against a pertinent portion of the database of biometric templates. For access, for example, the pertinent portion comprises all individuals outside the secured area secured by the door. Upon provision of a first sample, the pertinent portion of the database is restricted to those individuals with a likelihood of having provided the first sample. This portion is likely substantially smaller than the previous pertinent portion. When the current pertinent portion comprises more than one individual or when the individual is identified with a likelihood that is insufficient for maintaining system security, more samples are required.

In use of a doorway system, three LEDs can provide sufficient information for use of the system. A green LED indicates identification, a red LED indicates rejection and a yellow LED prompts for a further biometric information sample. Of course, the selection of LED colours and the design of a user interface are in accordance with a particular application. Even for a doorway, any of a number of user interface designs is compatible with the present invention.

Figure 11:
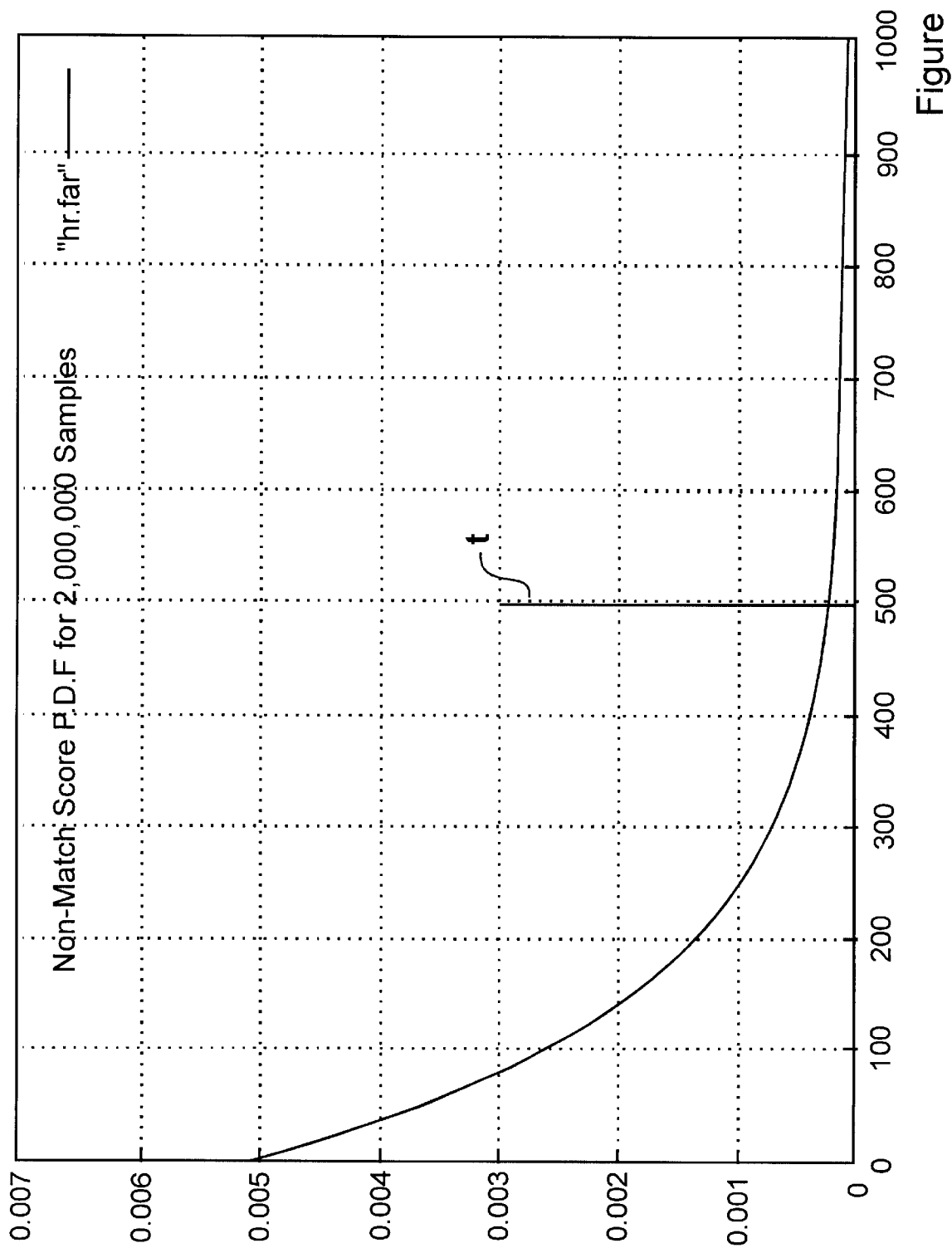
FIG. 11 is a probability distribution curve for individual identification using a biometric information sample.

Referring to FIG. 11, a two dimensional probability distribution is shown. The total area below the distribution curve is 1 unit area. Using such a curve, false acceptance or false registration is described. Most biometric information samples are easily characterised. The high initial point on the probability curve and the steep decent to an asymptotic curve approaching 0 shows this. The line t marks the cutoff for registration effectiveness. This is determined in dependence upon an algorithm chosen and upon system limitations such as processor speed, memory, and security requirements. The shaded region bounded by Y=0, X>t, and the probability curve represents false acceptances.

Figure 12:
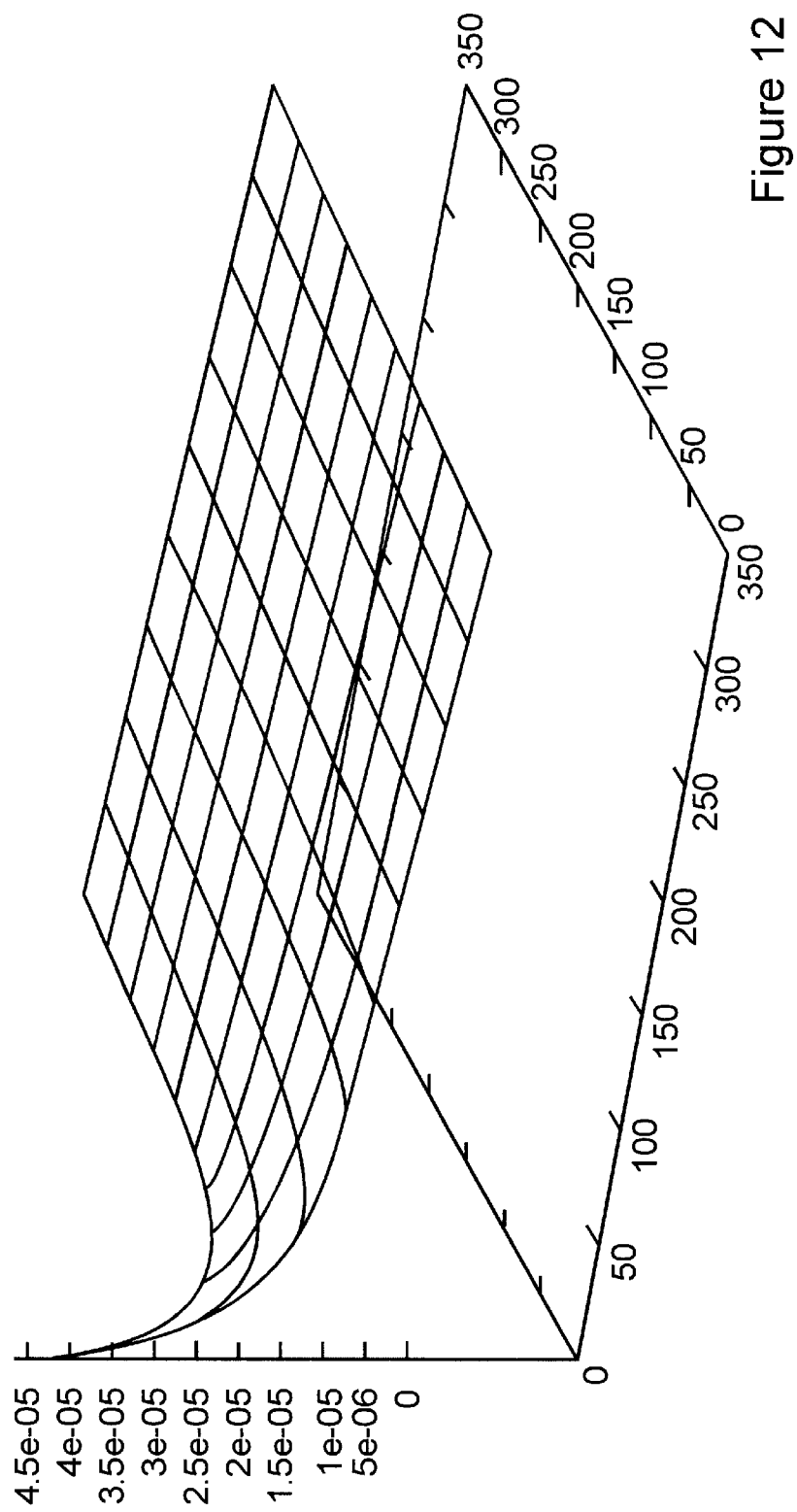
FIG. 12 is a two dimensional probability distribution surface for individual identification in dependence upon a plurality of biometric information samples.

Referring to FIG. 12, a truncated two dimensional probability distribution curve is shown. Now, false acceptance is represented by a region of three dimensional space having a volume of 1 or less units. Upon viewing the graph of actual data for fingerprint biometric information, it is apparent that the graph is symmetrical and that the graph extends toward infinity without reaching the plane z=0.

A plot showing an acceptance curve for registration is contained below the curve of FIG. 12. When the point falls below the line, the biometric information is not identified and correspondingly the individual is not identified. Alternatively, when the point falls within the shaded region, registration occurs. Extending this to a plurality of biometric information samples results in regions allowing for excellent registration of some samples, as shown in FIG. 12 at B, with moderate registrations of other samples. Using a plurality of biometric information samples, allows equivalent registration algorithms to provide greatly enhanced security or alternatively, allows faster and simpler registration algorithms to provide equivalent security.

In evaluating security of biometric authorization systems, false acceptance and false rejections are evaluated as a fraction of a user population. A security system is characterised as allowing 1 in 1,000 false acceptances or, alternatively, 1 in 1,000,000. Extending the graph of FIG. 13 to n dimensions, results in a different distribution for a region representing acceptance and, therefore, a match scores of a single biometric information sample that falls outside the shaded region of FIG. 12, when combined with several other similarly weak biometric information samples, is more likely to fall within an acceptable region. A reasonable correlation among several identifiers is a good indication of identity. Alternatively, using only a single biometric information sample, a low match score results in failure to authorize an individual. Likewise, a different individual entering a plurality of biometric information samples and trying to gain unauthorized access by, for example, posing as an authorized individual, is unlikely to match evenly across all samples and, whereas a single biometric information sample may match well, several will not. Further examination of an acceptance graph shows that excellent match scores of some samples reduce the necessary match scores for other samples for authorization to occur.

The probability density function is discussed below. Assume a probability density function, f, of non-match scores exists. That is, $$f: R \to [0, 1]$$

and $$\int_R f = 1$$

If $S = \{x | x = \text{score}(T_a, T_b)$, where $T_a$ and $T_b$ are characterisations of distinct fingerprints $\}$, then f is 0 outside of S, and $$\int_S f = \int_R f = 1.$$

It should be noted that $x \in S \rightarrow x \geq 0$ since score is a measure. An n-dimensional ability density function, g for a sequence of non-match scores is constructed by:

$$g(P) = \prod_i^n f(x_i), \text{ for } P \in R^n$$

Since each $f(x_i) \geq 0$, then it follows that $g(P) \geq 0$ and that $$\int_R f = 1 \Rightarrow \int_{R^n} g = 1$$

For any subset $U \subseteq S^n$, the probability that a collection of n scores of non-matching fingerprints lies in U is given by:

$$\int_U g$$

Given an n-dimensional probability density function, g, a region, $U_\alpha \subseteq S^n$ is defined, bounded "below" by a function, $h_\alpha: R^n \rightarrow R$.

$$U_\alpha = \{P \in S^n | h_\alpha(P) \geq C_\alpha\}.$$

$C_\alpha$ a constant, is calculated such that:

$$\int_{U_\alpha} g = \alpha$$

Thus, given a collection of n fingerprint match scores in the form of a point P, we determine when $P \in U_\alpha$ by applying the threshold function $h_\alpha$. Moreover, the probability that such a collection of scores belongs to $U_\alpha$ is $\alpha$ which can be interpreted as a predetermined false acceptance rate. The criteria $$h_\alpha(P) \geq C_\alpha$$

is used to accept the candidate when true, and reject the candidate otherwise.

Test Case

A large sample consisting of several million non-match comparisons has been generated from a database of fingerprint images in order to create a relative frequency distribution, F(X) of non-matching fingerprint scores. X=score $(T_a, T_b)$, where $T_a, T_b \in \tau$ are templates of different fingerprints. Note that the frequency distribution is a function of a discrete variable. For the purposes of the test case, we assumed that a continuous probability density function, f(x), of non-matching fingerprint comparisons exists, and all derivations are performed for the continuous case. When a calculation was required in dependence upon actual data, f was approximated by F, and integration was replaced by summation.

When we are given a sequence of n non-matching fingerprint scores, $\{x_i\}$, $1 \leq i \leq n$, then an n-dimensional probability density function, g, is derived as follows: Let $$P = (X_1, X_2, \ldots, X_n)$$

be a particular ordering of the sequence.

Define $$g(P) = \prod_i^n f(x_i);$$

since $$\int_R f = \int_S f = \int_0^\infty f(x)dx = 1$$

and $$R^n = R^{n-1} \times R$$

then it follows that $$\int_{R^n} g = \int_{R^n} \prod_i^n f(x_i) d\overline{x}$$

$$= \int_{R^{n-1}} \left( \int_R \left( \prod_i^{n-1} f(x_i) \right) f(x_n) dx_n \right) dx^{n-1}$$

$$= \int_{R^{n-1}} \left( \prod_i^{n-1} f(x_i) \int_R f(x_n) dx_n \right) dx^{n-1}$$

$$= \int_{R^{n-1}} \left( \prod_i^{n-1} f(x_i) \cdot 1 \right) dx^{n-1}$$

$$= \int_{R^{n-1}} \left( \prod_i^{n-1} f(x_i) dx^{n-1} \right)$$

Repeatedly applying iterated integrals in such a manner, eventually results in $$\int_{R^n} g = 1$$

When $U \subseteq R^n$, the probability that a collection of n scores of non-matching fingerprints lies in U is calculated by iterated integrals over rectangles in $R^n$ by:

$$\int_u g = \int_R g \cdot \chi u$$

where $U \subseteq R$, and R is a rectangle in $R^n$, and $\chi u$ is the characteristic function of the set U $$\chi u(P) = \begin{cases} 1 & P \in U \\ 0 & P \notin U \end{cases}$$

assuming that $\chi u$ and f are integrable. In the discrete case, we analogously define $$G(P) = \prod_i^n F(x_i)$$

G(P) gives the probability that the n independent scores, $\{x_i\}$ of non-matching finger prints occur in a particular sequence. (Note that g(P) does not give a probability at any specific point since the measure, and hence the integral, over a single point is zero).

For purposes of calculating false acceptance rates in n-dimensions, we must attempt to construct regions in $R^n$ that have desirable properties. Suppose that α and β are false acceptance rates. We would like to define regions $U_\alpha$, $U_\beta$ $\subseteq R^n$ such that:

$$\int_{U_\alpha} g = \alpha \quad \text{and} \quad \int_{U_\beta} g = \beta \quad (1)$$

$$U_\alpha = \{P \in S^n \mid h_\alpha(P) \geq C_\alpha\}, U_\beta = \{P \in S^n \mid h_\beta(P) \geq C_\beta\} \quad (2)$$

$$\alpha \leq \beta \Rightarrow U_\alpha \subseteq U_\beta \quad (3)$$

$$h_\alpha(P) = C_\alpha \Rightarrow g(P) \approx K_\alpha, h_\beta(P) = C_\beta \Rightarrow g(P) \approx K_\beta \quad (4)$$

The first condition simply defines a false acceptance rate as a probability. The second condition indicates that regions are bounded below by a threshold function where $C_\alpha$, $C_\beta$ are non-negative constants. The third condition states that when a point is a member of a false acceptance region with a lower probability, it also belongs to a false acceptance region associated with a higher probability. One way to achieve this is to have $h_\alpha = h_\beta$, (i.e. use the same function) and let $C_{\beta \leq C\alpha}$. The last condition attempts to ensure that points along or proximate the region boundaries retain substantially level contours on the n-dimensional probability density function. This reduces uneven boundaries "favouring" certain combinations of match scores.

It is worth noting that corresponding n-dimensional false rejection rates are calculated assuming that an analogous n-dimensional probability density function, $g^*$ is constructed from the probability density function of fingerprint match scores. The corresponding false rejection rate for an n-dimensional false rejection rate $_\alpha$ is given by:

$$\int_{SR-U_\alpha} g^*$$

Alternatively, the method is employed with retinal scanned biometric information. Further alternatively, the method is employed with palm prints. Further alternatively, the method is employed with non-image biometric data such as voice prints.

Figure 13:
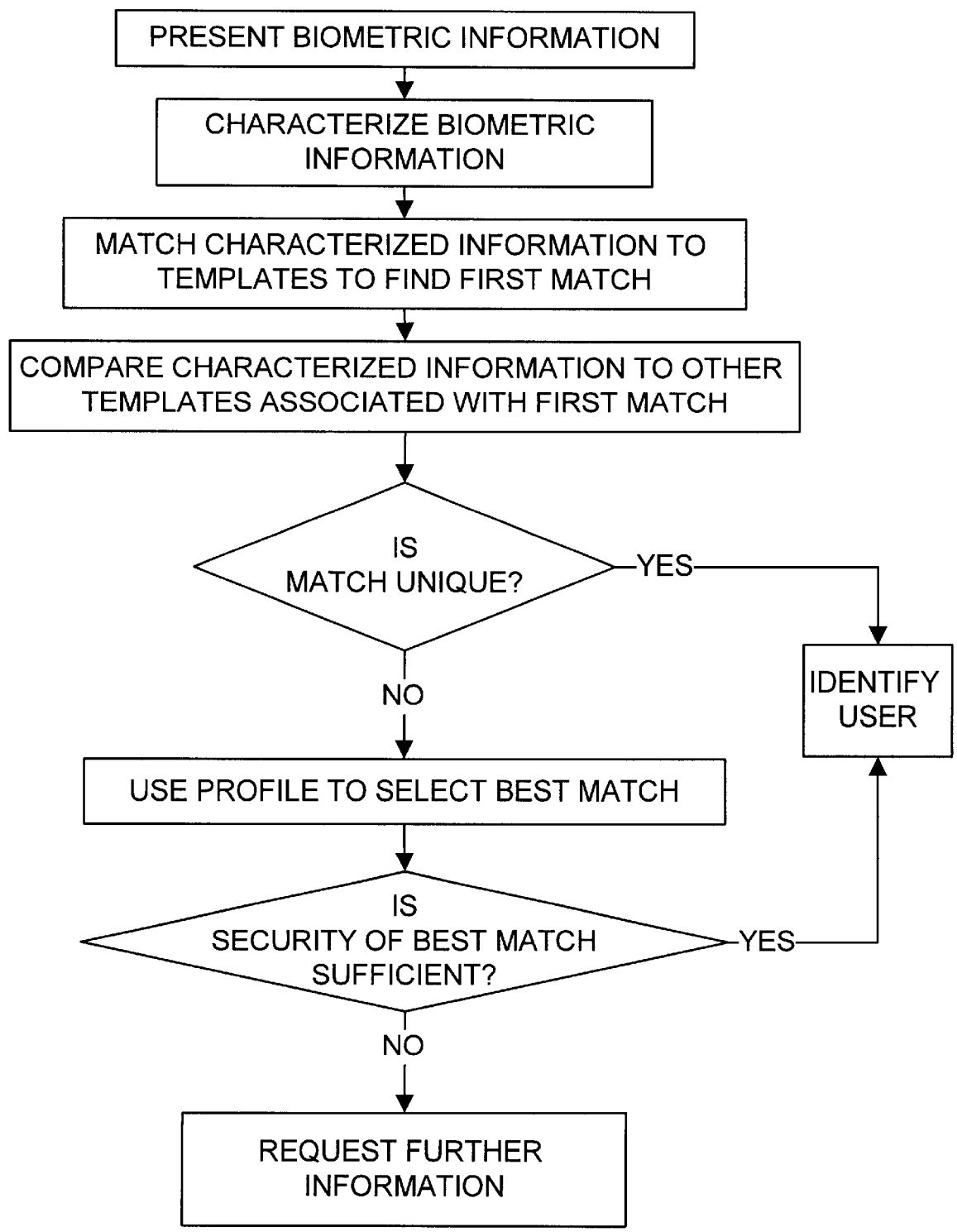
FIG. 13 is a flow diagram of another method of providing biometric information and identifying an individual in dependence thereon according to the invention.

One consequence of two different biometric sources is that the above math is complicated significantly. As a false acceptance rate for fingerprints may differ significantly from that of voice recognition devices or retinal scans, a different f(x) arises for the two latter cases resulting in asymmetric regions. For only fingerprint biometric information, ordering of samples is unimportant as false acceptance rates are substantially the same and therefor, the regions defined for registration are symmetrical as shown in FIG. 13. When different biometric source types are used and different functions for false acceptance result, order is important in determining point coordinates and an axis relating to voice recognition false acceptance should be associated with a coordinate value for same.

Of course, according to the invention a biometric information sample and a registration profile act in combination as two separate pieces of information and. though not completely independent, results in improved security with a same level of convenience. Each further biometric information sample will also have an associated profile and, as such, provide two pieces of information for the graphical analysis presented above.

Referring to FIG. 13, a method of improving security without requiring performance of additional steps by most individuals is shown. A user presents biometric information to a biometric input device. The information is characterised and the characterised information is matched against a template. When a successful registration occurs, data associated with the successfully registered template is retrieved and from that data, other templates are identified that are similar. Comparison with those templates is performed to determine whether the registration was unique. When the registration is unique, user identification is made and the process is complete. When an unsuccessful registration occurs, the registration profile is analysed to select among the potential identifications when possible within the systems security level. Optionally, the system prompts for each biometric information source a plurality of consecutive times.

For example, a user presents their index finger to a fingerprint scanner; registration fails to locate a good match or to locate a reasonable match/registration profile pairing and access is denied. The user again presents their index finger to the fingerprint scanner; registration again fails to locate a good match or to locate a reasonable match/registration profile pairing and access is denied. The user again presents their index finger to the fingerprint scanner; registration again fails to locate a good match or to locate a reasonable match/registration profile pairing and access is denied. The user is prompted to present their middle finger to the fingerprint scanner. Alternatively, the user selects and identifies their middle finger as the next biometric information source. The registration of the middle finger is performed according to the invention and therefore is not a same registration process as when the middle finger is the first finger presented to the scanner. Also, a registration profile is formed for the middle finger such that four separate pieces of information result—two fingerprints and two profiles. The registration relies on the best registration value from the index fingerprints and either a registration profile associated therewith or a combination of the registration profiles, with the registration results from the middle finger, determines whether identification should proceed. When unsuccessful registration occurs, the middle finger is presented two more times. When registration is still unsuccessful, another biometric source is requested or is selected by the user. Optionally, when registration results fall below a predetermined threshold, user identification fails. Alternatively, user identification fails when known biometric information sources of the user are exhausted. Of course, whenever a resulting registration value considered with previous registration values according to the invention results in a sufficiently accurate identification, data relating to the identification and indicative of potential errors in identification is retrieved and evaluated. Comparisons with other templates in accordance with the retrieved data are performed. When the comparisons result in no substantial matches, identification of the individual results. Otherwise, further fingerprints are presented to the fingerprint scanner until only one substantially correct identification results.

Advantages to this method are that the convenience of current fingerprint registration systems is enhanced over prior art systems for a many individuals; for a number of individuals, an extra fingerprint sample from another finger is still required; and, from a very small number of individuals, several fingerprints are required. The number is dependent on fingerprint quality, fingerprint characterisation process, desired level of security, population size, distinctiveness of biometric information, uniqueness of registration profiles, etc. It is evident to those of skill in the art that when individuals are enrolled, biometric information from a plurality of biometric information sources is provided, characterised and associated/stored with their identification. As such, a registration profile for use with a multi fingerprint system will include individuals and finger tips when fingertip identification is provided. When a user provides a fingertip without identifying same, it is sufficient to provide individual identifiers in the registration profile.

Because of the nature of, for example, fingerprints, the use of multiple fingerprints from a same individual provides an additional correlation as discussed herein. In an embodiment, with each fingerprint presented, analysis and registration provides one of three results—identified, rejected, unsure. When unsure, more biometric information is requested. The individual provides additional fingerprint data and again one of the three results is provided. When a final identification or a rejection occurs, the process stops. Optionally, a log of access attempts is maintained for later review.

In a further refinement of the embodiment, the processor prompts a user for their identity. When the user provides identification, biometric information is requested from sources in an order that is most likely determinative of the user identity. As before, the use of a registration profile with such an embodiment is highly advantageous.

For example, when biometric information from an index finger is provided and registered but fails to sufficiently identify the user, further biometric information is requested. The biometric information requested is selected such that a highest likelihood of identification results. Alternatively, the biometric information source is selected such that a highest likelihood of rejection results. Should the next sample of biometric information fail to be determinative—identification or rejection, further biometric information from another source is requested again attempting to make a final determination fastest.

When a user identity is not provided, a data structure indicating a next biometric information source to request is produced from all biometric information relating to the individual and the registration profile. For example, when the profile includes Abigail and Denise and it is known that Abigail's thumb is nothing like any of Denise's digits, prompting the user for a thumb print allows clear distinction between the two determined possibilities. In dependence upon a registration value of a current biometric information sample, user identification, rejection, or requesting further biometric information results. In the latter case, the requested information is determined based on the known biometric information and registration values associated therewith. For example, biometric information is provided from a first biometric information source. Registration is performed and is inconclusive. It is determined that a particular biometric information source comprises information most likely to result in identification or failure thereby being determinative; that biometric information source is polled.

When selecting subsequent biometric information sources, preferably, all possible outcomes are analyzed and the outcome of failed identification is not itself considered a single outcome but is weighted more heavily. The advantages to this approach are evident from the example below.

In another example for use in identifying individuals by searching a database of enrolled individuals, biometric information is provided from a right thumb. Registration is performed and is inconclusive determining that the right thumb is likely that of John, Susan, or Peter but may also be that of Jeremy, Gail, or Brenda. Reviewing data associated with John, Susan, or Peter, it is determined that Joe has each of these three within his registration profile. Thus a best profile match is Joe even though his identity did not turn up as a likely identification. That said, in order to identify an individual with a predetermined security level, the biometric information and the profile information should converge on a same individual. A next biometric information source is selected such that clear discrimination between the individuals results and a likely identification will occur. The next biometric information source is one that easily eliminates a large number of the potential individuals. In this example, the right ring finger is selected because Susan and Peter have very distinctive ring fingers. Biometric information from the right ring finger is provided and registered with templates in the database. Though the right ring finger is most likely that of Jim or Susan, it is evident that Susan, appearing in both lists, is the front runner. Data associated with Jim is retrieved and it is determined that Susan is sometimes erroneously identified as Jim. Also, the registration result for Peter is sufficiently low that it is unlikely that Peter is the individual. Though neither registration value would identify Susan on its own with the desired level of security, when the two registrations are taken together, Susan is indeed identified. Alternatively, when the resulting list is still not conclusive—two or more people identified or noone identified with sufficient certainty, further biometric information from another biometric information source is requested.

The data is arranged such that in dependence upon previous registration results a next biometric information source is polled. Using such a system, searching large databases for accurate registration is facilitated and reliability is greatly increased. Preferably, the database is precompiled to enhance performance during the identification process.

In another embodiment, templates are formed by characterizing a plurality of fingerprints of an individual and constructing a single composite template comprising fingerprint information from each fingerprint. Using such a composite template, identification of biometric information sources is obviated. For example, an individual provides a fingerprint to a biometric imaging device. The imaged fingerprint is provided to a processor. The processor need not be provided with information regarding the biometric source—the exact finger—in order to perform template matching. The fingerprint is registered with a single composite template to produce a registration value. The registration value is used to identify the individual, prompt the individual for another fingerprint, or reject the individual.

Methods of forming composite templates include selecting a plurality of features from each fingerprint, selecting similar features from each fingerprint, forming a data structure indicative of fingerprint identification and indicative of features, etc. In an embodiment a data structure comprises a first feature to verify. When present, a next feature or set of features is verified. When absent a different feature or set of features is verified. By providing the data in a tree structure such as a binary tree, finger and registration values are identified simultaneously. Also, a data structure allows for compilation of a known group of biometric information, e.g. 10 fingerprints, for use with the present invention wherein identification is dependent upon a plurality of different biometric information samples.

Alternatively, single composite templates having a plurality of features from each fingerprint are formed by mapping selected features and information regarding the features into the composite template. This allows for a processing of the template against a characterised fingerprint to produce a registration value. Often, the registration process using composite templates is different from that using individual templates.

Another method of forming composite templates is to form templates having finer and finer resolutions each associated with a smaller group of templates. For example, a first coarse template determines whether or not to match the characterised fingerprint against other finer templates. In use, a fingerprint is compared against coarse templates. When a match within predetermined limits occurs, finer templates associated with the coarse template are also matched against the fingerprint. When the match is not within predetermined limits, the finer templates associated with the coarse templates and all finer templates associated therewith are excluded from further matching. This improves performance of the individual identification system.

The arrangement of data for the present method is similar to that of a tree structure. A coarse template may be a same template for different finer templates. Therefore, registration is performed against a small number of coarse templates in order to limit the number of finer templates. The process is repeated at each node of the tree until an identification of the individual or until a most likely node is determined. Further biometric information from a different biometric information source is registered in a similar fashion. Because each node as one descends throughout the tree structure toward the leaves is related to fewer individuals, an intersection of potential individuals from each search determines potential identifications. Preferably, more than one potential node is identifiable with each biometric information source. For example, registration of the index finger results in a selection of two nodes—a and b. Each node is associated with a number of individuals. Registration of the middle finger is associated with three different nodes—c, d, and e. An intersection $(a \cup b) \cap (c \cup d \cup e)$ results in potential identifications. When the intersection contains a small number of individuals, registration against individual templates is performed according to the method and using each biometric sample provided from a different biometric information source in order to identify the individual with a predetermined level of security.

Of note, when using different biometric information sources, an asymmetric probability distribution results. This often makes determination of threshold functions more difficult. In an embodiment, when an asymmetry exists in the probability distribution function, weighting of registration values is used. This allows for balancing of inconsistencies in registration processes for different biometric information sources or, alternatively, more emphasis on certain biometric information sources than on others.

Referring to FIG. 2, a diagram of a data structure for storing a registration profile is presented. According to the data structure, each profile entry is stored with a name and a ranking. As such, a profile stores an index value and a 3-bit value to indicate the top 8 matches. When 1024 people are enrolled, this requires 10 bits and 3 bits or 13 bits per individual and 13 bytes per profile. Alternatively, as shown in FIG. 3, a profile is stored as a series of index values and highest order bits of registration values. For example, from Table 1, the lowest order 6 bits could be stripped from 9-bit registration value to result in 3 bits. Here the difference is that the two frontrunners now have a same ranking, as do the following 2 individuals within the registration profile. Many other embodiments of storing the registration profile are also possible. In a very course implementation, profiles are stored as a single bit per individual—128 bytes for 1024 individuals) where a one indicates an individual is within the profile and a 0 indicates that the individual is not within the profile. Thus, a comparison of profiles is a simple logical operation. Of course, the reduced overhead and small computational requirements probably still result in a smaller profile being preferable.

Numerous other embodiments may be envisaged without departing from the spirit and scope of the invention.

What is claimed is:

1. A method of identifying an individual comprising the steps of:
   a) receiving a biometric information sample from a biometric information source of the individual;
   b) characterising the biometric information sample;
   c) comparing the characterised biometric information sample against some of a plurality of stored templates to determine a registration profile comprising indicators of a plurality of templates that match the characterised biometric information sample within predetermined limits;
   d) comparing the registration profile against at least a stored registration profile to determine an identification associated with a registration profile similar to the determined registration profile; and,
   e) identifying the individual when the associated registration profile is similar with the determined registration profile within a first predetermined limit.

2. A method of identifying an individual as defined in claim 1 comprising the steps of:
   comparing the characterised biometric information sample against some of a plurality of stored templates to determine a stored template that most closely matches the characterised biometric information sample; and, wherein the at least a stored registration profile is a registration profile associated with the determined stored template.

3. A method of identifying an individual as defined in claim 2 wherein the step of:
   a) comparing the characterised biometric information sample against some of a plurality of stored templates to determine a stored template that most closely matches the characterised biometric information sample determines a plurality of stored templates that match the characterised biometric information sample within predetermined limits; and,
   b) based on a stored registration profile associated with each determined stored template determining a registration profile that most closely matches the determined registration profile.

4. A method of identifying an individual as defined in claim 3 wherein the step of:
   identifying the individual when the associated registration profile is similar with the determined registration profile within a first predetermined limit is performed in dependence upon a quality of each match between the characterised biometric information sample and a stored template associated with the registration profile.

5. A method of identifying an individual presenting a biometric information sample to a system as defined in claim 2 wherein the biometric information source is a fingertip.

6. A method of identifying an individual as defined in claim 1 wherein the registration profile comprises a predetermined number of indicators of a plurality of templates that most closely match the characterised biometric information sample.

7. A method of identifying an individual as defined in claim 6 wherein the step of comparing the characterised biometric information sample against some of a plurality of stored templates includes the following steps:
   a) comparing the characterised biometric information sample against each of a the stored templates to determine an associated registration result;

b) selecting a predetermined number of the templates having most preferable registration results; and c) determining a registration profile based on the selected predetermined number of templates, the registration profile indicative of the selected predetermined number of templates.

8. A method of identifying an individual as defined in claim 7 wherein the registration profile includes ordering information relating to an ordering of the associated registration results.

9. A method of identifying an individual as defined in claim 8 wherein the step of comparing the registration profile against at least a stored registration profile includes the step of:

comparing the indicators within the registration profile against indicators within the at least a stored registration profile and comparing the ordering information within the registration profile against indicators within the at least a stored registration profile.

10. A method of identifying an individual as defined in claim 9 wherein the step of identifying the individual includes the step of determining an individual identity relating to a template associated with the determined registration profile.

11. A method of identifying an individual as defined in claim 10 wherein the step of identifying the individual includes the step of registering the biometric information against the associated template to verify the identification.

12. A method of identifying an individual as defined in claim 6 comprising the steps of:

comparing the characterised biometric information sample against some of a plurality of stored templates to determine registration results relating to a closeness of a match between the characterised biometric information and each stored template; and wherein the step of identifying the individual is performed in dependence upon closely matching registration profiles and registration results indicative of a close match.

* * * * *